United States Patent
Kumar et al.

(10) Patent No.: US 11,300,742 B2
(45) Date of Patent: Apr. 12, 2022

(54) OPTICAL FIBER RIBBON CABLE

(71) Applicant: Sterlite Technologies Limited, Gurgaon (IN)

(72) Inventors: Sravan Kumar, Gurugram (IN); Kishore Chandra Sahoo, Gurugram (IN); Hemanth Kondapalli, Gurugram (IN); Atul Kumar Mishra, Gurugram (IN); Vikash Shukla, Gurugram (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

(21) Appl. No.: 16/993,194

(22) Filed: Aug. 13, 2020

(65) Prior Publication Data
US 2021/0048589 A1 Feb. 18, 2021

(30) Foreign Application Priority Data
Aug. 14, 2019 (IN) .............................. 201911032852

(51) Int. Cl.
*G02B 6/44* (2006.01)

(52) U.S. Cl.
CPC ........... *G02B 6/4404* (2013.01); *G02B 6/443* (2013.01); *G02B 6/4411* (2013.01)

(58) Field of Classification Search
CPC .. G02B 6/4403; G02B 6/4404; G02B 6/4411; G02B 6/443
See application file for complete search history.

(56) References Cited

U.S. PATENT DOCUMENTS

| | | | | |
|---|---|---|---|---|
| 5,457,762 A * | 10/1995 | Lochkovic | ........... | G02B 6/4403 385/114 |
| 7,574,058 B2 * | 8/2009 | Kitamura | ............. | H04N 19/593 382/232 |
| 7,606,453 B2 * | 10/2009 | Tanaka | ................... | G02B 6/448 385/114 |
| 9,529,168 B2 * | 12/2016 | Benjamin | .............. | G02B 6/036 |
| 9,880,368 B2 * | 1/2018 | Debban | ................ | G02B 6/4403 |
| 10,185,089 B2 * | 1/2019 | Burek | .................. | G02B 6/4495 |
| 10,185,105 B2 * | 1/2019 | Risch | ..................... | G02B 6/448 |
| 10,241,262 B2 * | 3/2019 | Iwaguchi | ................ | C03C 25/24 |
| 10,775,557 B2 * | 9/2020 | Chien | .................. | C03B 37/032 |
| 10,884,213 B1 * | 1/2021 | Fallahmohammadi | ...................... | G02B 6/448 |
| 2003/0044141 A1 * | 3/2003 | Melton | ................ | G02B 6/4472 385/114 |

(Continued)

Primary Examiner — Ryan A Lepisto

(57) ABSTRACT

The present disclosure provides an optical fibre ribbon. The optical fibre ribbon includes a plurality of optical fibres bonded with a matrix material. The matrix material is applied along a longitudinal length of the plurality of optical fibres. Further, the plurality of optical fibres is defined by a geometrical centre and diameter. Further, the plurality of optical fibres has a predefined distance between geometrical centres of any two adjacent optical fibres of the plurality of optical fibres. Moreover, the predefined distance between geometrical centres of any two adjacent optical fibres of the plurality of optical fibres is less than 200 microns. Further, the optical fibre ribbon provides the optical fibre ribbon cable that is flexible and easy to install in space constraint regions and allows ribbons to bend easily at non-preferential axis. Furthermore, the optical fibre ribbon with reduced weight and with high mass fusion splicing capability.

9 Claims, 2 Drawing Sheets

(56) References Cited

U.S. PATENT DOCUMENTS

| | | | |
|---|---|---|---|
| 2003/0165679 A1* | 9/2003 | Bosisio | C03C 25/475 |
| | | | 428/375 |
| 2009/0060432 A1* | 3/2009 | Sako | G02B 6/14 |
| | | | 385/114 |
| 2017/0242187 A1* | 8/2017 | Iwaguchi | G02B 6/4403 |
| 2020/0192023 A1* | 6/2020 | Brown | C03C 25/104 |
| 2020/0192040 A1* | 6/2020 | Li | G02B 6/4403 |
| 2020/0257069 A1* | 8/2020 | Benjamin | G02B 6/448 |

* cited by examiner

OPTICAL FIBER RIBBON CABLE

BACKGROUND OF THE INVENTION

Field of the Invention

The present disclosure relates to the field of optical fibre cable and, in particular, relates to an optical fibre ribbon cable for easy installation. This application is based on, and claims priority from an Indian Application Number 201911032852 filed on 14 Aug. 2019.

Description of the Related Art

Optical fibre cables have secured an important position in building network of modern communication systems across the world. One such type of optical fibre cables are optical fibre ribbon cables. These optical fibre ribbon cables include a plurality of optical fibres ribbons. Each optical fibre ribbon includes a number of optical fibres placed adjacent and bonded together side by side with a matrix material. Some optical fibre ribbon cables are designed for large data transmission which requires large number of optical fibres inside the optical fibre ribbon cable. These optical fibre ribbons may be held inside a buffer tube which may be covered by additional layers such as water blocking layers, armoring layer, sheathing layer and the like. In addition, these optical fibre ribbon cables can be prepped and spliced rapidly through mass fusion splicing. The optical fibre ribbons inside an optical fibre cable have a single plane of motion and can be bent only along a preferential axis in order to prevent damage to the cable. Also, the diameter of the buffer tube covering the optical fibre ribbon has to be increased in order to prevent installers from bending the cable in a non-preferential plane. This leads to increase in overall diameter of the optical fibre cable. So, there is a need for an optical fibre cable which can be bent in non-preferential plane and has reduced diameter.

BRIEF SUMMARY OF THE INVENTION

In an aspect, the present disclosure talks about an optical fibre ribbon. The optical fibre ribbon includes a plurality of optical fibres bonded with a matrix material. Further the matrix material is applied along a longitudinal length of the plurality of optical fibres. Furthermore, the plurality of optical fibres is defined by a geometrical center and diameter. Moreover, the plurality of optical fibres has a predefined distance between centers of any two adjacent optical fibres of the plurality of optical fibres in an optical fibre ribbon. Also, the predefined distance between centers of adjacent optical fibres of the plurality of optical fibres is less than 200 microns.

A primary object of the present disclosure is to provide an optical fibre ribbon cable possessing a reduced diameter.

Another object of the present disclosure is to provide the optical fibre ribbon cable that is flexible and easy to install.

Yet another object of the present disclosure is to provide the optical fibre ribbon cable which allows ribbons to bend easily at non-preferential axis.

Yet another object of the present disclosure is to provide the optical fibre ribbon cable with reduced weight.

Yet another object of the present disclosure is to provide the optical fibre ribbon cable with high mass fusion splicing capability.

In an embodiment of the present disclosure, the plurality of optical fibres is completely bonded with the matrix material along the longitudinal length of optical fibre ribbon. Further, the plurality of optical fibres is partially bonded with the matrix material along the longitudinal length of the optical fibre ribbon.

In an embodiment of the present disclosure, the predefined distance between centers of any two adjacent optical fibres is equal to diameter of the optical fibres.

In an embodiment of the present disclosure, the predefined distance between centers of any two adjacent optical fibres of the plurality of the optical fibres is in range of about 160 microns to 200 microns.

In an embodiment of the present disclosure, the plurality of optical fibres has a diameter in range of about 160 microns to 200 microns.

In an embodiment of the present disclosure, the plurality of optical fibres of the optical fibre ribbon along with the matrix material is defined by a top surface and a bottom surface. Further, thickness of the matrix material over the plurality of optical fibres on the top surface and the bottom surface of the optical fibre ribbon is in range of about 15 microns to 60 microns on each of the top surface and the bottom surface.

In an embodiment of the present disclosure, the optical fibre ribbon has a height in range of about 190 microns to 320 microns.

In an embodiment of the present disclosure, the optical fibre ribbon has width in range of about 1.95 millimeter to 2.55 millimeter.

In an embodiment of the present disclosure, the matrix material may or may not occupy shape of the optical fibre ribbon. Further, shape of the matrix material is one of a grooved shape or a flat shape.

In an embodiment of the present disclosure, the optical fibre ribbon has width of about 2.19 millimeter, corresponding to 180 microns diameter of the plurality of optical fibres and the predefined distance of 180 microns.

In an embodiment of the present disclosure, each of the plurality of optical fibres of the optical fibres ribbon has a primary coating, a secondary coating and a color coating.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
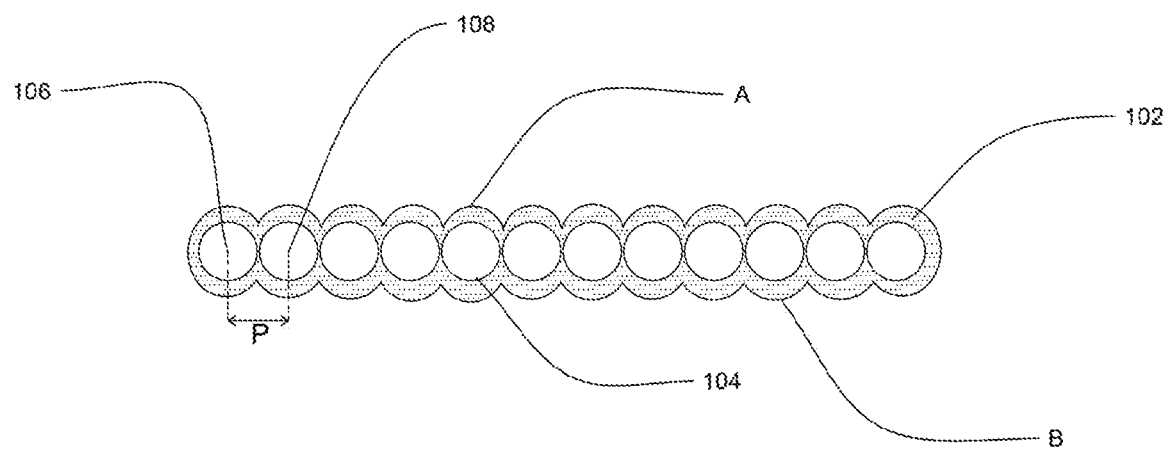
FIG. 1 illustrates an optical fibre ribbon, in accordance with various embodiments of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Optical fibre ribbon.
102. Matrix material.
104. Plurality of optical fibres.
106. Geometrical centre.
108. Geometrical centre.
200. Optical fibre ribbon cable.
202. Longitudinal axis.
204. First layer.
206. Plurality of buffer tubes.
208. Second layer.
210. Plurality of strength members.
212. Plurality of ripcords.
214. Plurality of ripcords.
216. One or more water swellable yarns.
218. Optical fibre ribbon stack.
A. Top surface.
B. Bottom surface.
P. Predefined distance.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates an optical fibre ribbon 100, in accordance with various embodiments of the present disclosure. The optical fibre ribbon 100 includes a plurality of optical fibres 104 bonded with a matrix material 102. In general, optical fibre ribbon is made of a number of optical fibres. In general, an optical fibre refers to medium associated with transmission of information over long distances in the form of light pulses. In addition, the optical fibre is a type of cabling technology that uses light to transmit voice and data communications over long distances. In addition, each of the plurality of optical fibres 104 of the optical fibre ribbon 100 has a primary coating, a secondary coating and a color coating. Further, the plurality of optical fibres 104 along with the matrix material 102 forms the optical fibre ribbon 100. The matrix material 102 is applied along a longitudinal length of the plurality of optical fibres 104. In an embodiment of the present disclosure, the plurality of optical fibres 104 is completely bonded with the matrix material 102 along the longitudinal length of optical fibre ribbon 100. In another embodiment of the present disclosure, the plurality of optical fibres 104 is partially bonded with the matrix material 102 along the longitudinal length of the optical fibre ribbon 100. A partially bonded optical fiber ribbon 100 has improved flexibility, such as being able to be rounded or bent in any direction due to discrete bonding of the plurality of optical fibres 104 in the longitudinal length of the optical fibre ribbon 100.

Further, each of the plurality of optical fibres 104 of the optical fibre ribbon 100 is defined by a geometrical centre and diameter. In an example, a first optical fibre of the plurality of optical fibres 104 of the optical fibre ribbon 100 is defined by a geometrical centre 106. In addition, a second optical fibre of the plurality of optical fibres 104 of the optical fibre ribbon 100 is defined by a geometrical centre 108. Further, the plurality of optical fibres 104 has a predefined distance P between geometrical centres of every two adjacent optical fibres of the plurality of optical fibres 104. In an embodiment of the present disclosure, the predefined distance P between the geometrical centre 106 of the first optical fibre and the geometrical centre 108 of the second optical fibre is about 160 microns. In another embodiment of the present disclosure, the predefined distance P between the geometrical centre 106 of the first optical fibre and the geometrical centre 108 of the second optical fibre is in range of about 160 microns to 200 microns. In yet another embodiment of the present disclosure, the predefined distance P between the geometrical centre 106 of the first optical fibre and the geometrical centre 108 of the second optical fibre may vary. The geometrical centers 106, 108 of first optical fibre and second optical fibre of the plurality of optical fibres 104 has been marked (as shown in FIG. 1). However, each optical fibre of the plurality of optical fibres 104 is defined by the geometrical centre. The predefined distance P between geometrical centres of any two adjacent optical fibres of the plurality of optical fibres 104 is in range of about 160 microns to 200 microns. In an embodiment of the present disclosure, predefined distance P between geometrical centres of any two adjacent optical fibres of the plurality of optical fibres 104 may vary.

The plurality of optical fibres 104 is defined by diameter. In an embodiment of the present disclosure, each of the plurality of optical fibres 104 has diameter in range of about 160 microns to 200 microns. In another embodiment of the present disclosure, range of diameter of each of the plurality of optical fibres 104 may vary. In an embodiment of the present disclosure, number of the plurality of optical fibres 104 of the optical fibre ribbon 100 is 12. In another embodiment of the present disclosure, number of the plurality of optical fibres 104 of the optical fibre ribbon 100 may vary. In an embodiment of the present disclosure, each of the plurality of optical fibres is a coloured optical fibre.

The plurality of optical fibres 104 of the optical fibre ribbon 100 along with the matrix material 102 is defined by a top surface A and a bottom surface B. Further, the matrix material 102 is applied at the top surface A and the bottom surface B of the plurality of optical fibres 104. In addition, the matrix material 102 has thickness. In an embodiment of the present disclosure, thickness of the matrix material 102 on the top surface A and the bottom surface B is in range of about 15 microns to 60 microns. In another embodiment of the present disclosure, thickness of the matrix material 102 on the top surface A and the bottom surface B may vary. Furthermore, the matrix material 102 may or may not occupy shape of the optical fibre ribbon 100. In an embodiment of the present disclosure, shape of the matrix material 102 is one of a grooved shape or a flat shape. In another embodiment of the present disclosure, shape of the matrix material 102 may vary. In an embodiment of the present disclosure, the matrix material 102 is acrylate matrix material. In another embodiment of the present disclosure, the matrix material 102 is made of any suitable material of the like.

In an embodiment of the present disclosure, the optical fibre ribbon 100 is a corrugated bendable optical fibre ribbon. In another embodiment of the present disclosure, the optical fibre ribbon 100 is an intermittently bonded optical fibre ribbon. In an embodiment of the present disclosure, the optical fibre ribbon 100 has height in range of about 190 microns to 320 microns. In another embodiment of the present disclosure, height of the optical fibre ribbon 100 may vary. In an embodiment of the present disclosure, the optical fibre ribbon 100 has width in range of about 1.95 millimeter to 2.55 millimeter corresponding to 12 optical fibres. Further, the optical fibre ribbon 100 has width of about 2.19 millimeter, corresponding to 12 optical fibres with diameter of 180 microns and the predefined distance P of 180 microns. In another embodiment of the present disclosure, width of the optical fibre ribbon 100 may vary.

Figure 2:
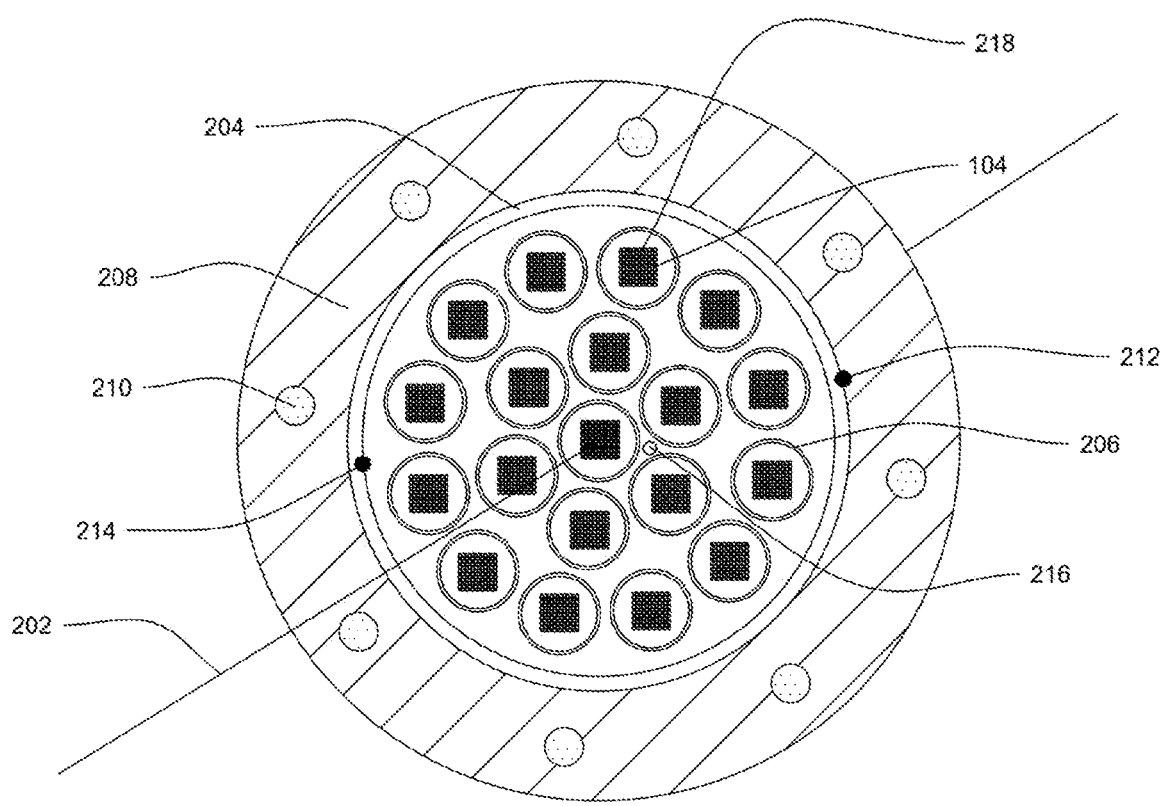
FIG. 2 illustrates a cross sectional view of an optical fibre ribbon cable, in accordance with various embodiments of the present disclosure.

FIG. 2 illustrates a cross sectional view of an optical fibre ribbon cable 200, in accordance with various embodiments of the present disclosure. The optical fibre ribbon cable 200 is a type of cable used in campus, building, data center backbone applications and the like. In general, optical fibre ribbon cable is used where high fibre counts are required. In general, the optical fibre ribbon cable has high fibre density. In addition, the optical fibre ribbon cable 200 enhances utilization of pathway and spaces for installation. In general, the optical fibre ribbon cable is suitable for installation in aerial, duct, and direct buried applications. The optical fibre ribbon cable 200 is manufactured and spliced rapidly. In general, the optical fibre ribbon cable allows up to 12 fibres to be spliced together at one time. Further, the optical fibre ribbon cable 200 is cost competitive. In an embodiment of the present disclosure, the optical fibre ribbon cable 200 includes 1728 optical fibres. In another embodiment of the present disclosure, the optical fibre ribbon cable 200 includes 2592 optical fibres. In yet another embodiment of the present disclosure, number of optical fibres in the optical fibre ribbon cable 200 may vary. In an embodiment of the present disclosure, the optical fibre ribbon cable 200 with 1728 optical fibres has diameter in range of about 20 millimeter to 24 millimeter. In another embodiment of the present disclosure, diameter of the optical fibre ribbon cable 200 may vary. Furthermore, diameter of the optical fibre ribbon cable 200 vary based on variation in optical fibre count.

The optical fibre ribbon cable 200 includes a plurality of buffer tubes 206, a first layer 204, a second layer 208 and a plurality of strength members 210. In addition, the optical fibre ribbon cable 200 a plurality of ripcords 212, 214 and one or more water swellable yarns 216.

The optical fibre ribbon cable 200 is defined along a longitudinal axis 202. In general, longitudinal axis of an optical fibre cable is an imaginary axis along lengthwise direction of the optical fibre cable. The optical fibre ribbon cable 200 includes the plurality of buffer tubes 206. In general, buffer tubes provide mechanical isolation to fibres present in the buffer tubes. Each of the plurality of buffer tubes 206 includes an optical fibre ribbon stack 218. The optical fibre ribbon stack 218 includes a plurality of optical fibre ribbons. In an embodiment of the present disclosure, number of plurality of optical fibre ribbons in the optical fibre ribbon stack 218 is 12. In another embodiment of the present disclosure, number of plurality of optical fibre ribbons in the optical fibre ribbon stack 218 may vary. Each ribbon of the plurality of optical fibre ribbons of the optical fibre ribbon stack 218 corresponds to the optical fibre ribbon 100 of FIG. 1. Each ribbon of the optical fibre ribbon stack 218 includes the plurality of optical fibres 104. In an embodiment of the present disclosure, each ribbon of the optical fibre ribbon stack 218 includes 12 optical fibres. In another embodiment of the present disclosure, number of the plurality of optical fibres 104 in each ribbon of the optical fibre ribbon stack 218 may vary.

The plurality of buffer tubes 206 correspond to loose tubes with reduced diameter. In an embodiment of the present disclosure, cross section of each of the plurality of buffer tubes 206 is circular in shape. In another embodiment of the present disclosure, shape of the plurality of buffer tubes 206 may vary. In an embodiment of the present disclosure, each of the plurality of buffer tubes 206 is similar in structure and dimensions. In addition, each of the plurality of buffer tubes 206 has an inner diameter and an outer diameter. The inner diameter of each of the plurality of buffer tubes 206 is about 4.1 millimeter corresponding to the optical fibre ribbon stack 218 with 12 optical fibre ribbons. In an embodiment of the present disclosure, the inner diameter of the plurality of buffer tubes may vary. In addition, the outer diameter of each of the plurality of buffer tubes 206 is about 4.5 millimeter corresponding to the optical fibre ribbon stack 218 with 12 optical fibre ribbons. In an embodiment of the present disclosure, the outer diameter of the plurality of buffer tubes may vary. In an embodiment of the present disclosure, the plurality of buffered tubes 206 provides mechanical isolation to each ribbon of the optical fibre ribbon stack 218. In addition, the plurality of buffer tubes 206 provides protection to each ribbon of the optical fibre ribbon stack 218 from physical damage.

The plurality of optical fibres 104 is defined by diameter. In an embodiment of the present disclosure, diameter of each of the plurality of optical fibres 104 is in range of about 160 microns to 200 microns. In another embodiment of the present disclosure, range of diameter of each of the plurality of optical fibres 104 may vary. Further, each of the plurality of optical fibres 104 is coated with acrylate material. Furthermore, acrylate material is soft material with high elongation. In an embodiment of the present disclosure, each of the plurality of optical fibres 104 with the coating of acrylate material has diameter in a range of about 160 microns to 200 microns. Furthermore, each of the plurality of optical fibres 104 is defined by the geometrical centre. The geometrical centres of any two adjacent optical fibres of the plurality of optical fibres 104 has a predefined distance P. In an embodiment of the present disclosure, the predefined distance P is less than 200 microns. In another embodiment of the present disclosure, the predefined distance P is in range of about 160 microns to 200 microns. In yet another embodiment of the present disclosure, the predefined distance P is 160 microns. In yet another embodiment of the present disclosure, the predefined distance P is 165 microns. In yet another embodiment of the present disclosure, the predefined distance P is 180 microns. In yet another embodiment of the present disclosure, the predefined distance P is 200 microns. In yet another embodiment of the present disclosure, the predefined distance P may vary. Moreover, the predefined distance P between any two adjacent optical fibres of the plurality of optical fibres 104 is equal to diameter of each of the plurality of optical fibres 104. In general, predefined distance P is distance between geometrical centers of any two optical fibres lying adjacent to each other. Furthermore, a natural fiber is a fiber with pure glass without any coating and a diameter of the natural fiber is less than 200 microns and an interfiber distance between the optical fibers in the ribbon is greater than or equal to the diameter of each of the plurality of optical fibres and the optical fibers are coated or uncoated.

Each ribbon of the optical fibre ribbon stack 218 enable mass fusion splicing of the plurality of optical fibres 104. In general, mass fusion splicing technique is used to fuse a number of optical fibres in a single ribbon simultaneously. In general, mass fusion splicing technique may fuse up to 12 fibres in the single ribbon at one time. In an embodiment of the present disclosure, mass fusion splicing technique fuses each of the plurality of optical fibres 104 into the optical fibre ribbon stack 218 simultaneously. In addition, mass fusion technique reduces installation time of the optical fibre ribbon cable 200. Further, mass fusion splicing technique reduces installation labor cost. Furthermore, mass fusion splicing technique reduces dimensions of each ribbon of the optical fibre ribbon stack 218. The dimensions of each ribbon of the optical fibre ribbon stack 218 include but may not be limited to width and height. In an embodiment of the present disclosure, width of each ribbon of the optical fibre ribbon stack 218 has in range of about 1.95 millimeter to 2.55 millimeter. In another embodiment of the present disclosure, range of width of each ribbon of the optical fibre ribbon stack 218 may vary. Furthermore, each ribbon of the optical fibre ribbon stack 218 has height of in range of about 190 microns to 320 microns. In an embodiment of the present disclosure, range of height of each ribbon of the optical fibre ribbon stack 218 may vary. Moreover, each ribbon of the optical fibre ribbon stack 218 has flexibility due to acrylate matrix material used for coating. Also, flexibility allows each ribbon of the optical fibre ribbon stack 218 to bend in non-preferential axis. The bending of each ribbon of the optical fibre ribbon stack 218 in non-preferential axis allows easy installation in space constraint regions. In addition, the bending of each ribbon of the optical fibre ribbon stack 218 in non-preferential axis facilitates in the reduction of diameter of the plurality of buffer tubes 206 and diameter of the optical fibre ribbon cable 200. Also, the optical fibre ribbon cable 200 maintains planarity of each ribbon of the optical fibre ribbon stack 218.

The optical fibre ribbon cable 200 includes the first layer 204. The first layer 204 surrounds the plurality of buffer tubes 206. The first layer 204 is a layer of water blocking tape. In general, water blocking tape is designed to block ingression of water inside optical fibre cables. In an embodiment of the present disclosure, the first layer 204 prevents ingression of water and moisture inside the plurality of buffer tubes 206. In an embodiment of the present disclosure, the first layer 204 has a thickness in range of about 0.1 millimeter to 0.2 millimeter. In another embodiment of the present disclosure, range of the thickness of the first layer 204 may vary.

The optical fibre ribbon cable 200 includes the second layer 208. The second layer 208 surrounds the first layer 204. The second layer 208 is a jacket layer. In general, the jacket protects the optical fibre ribbon cable 200 against crush, pressure and tensile stress. In an embodiment of the present disclosure, the second layer 208 is made of high density polyethylene material. In another embodiment of the present disclosure, the second layer 208 is made of any suitable material. In general, the high density polyethylene material has density in a range of about 0.941 gram/centimeter$^3$-0.971 gram/centimeter$^3$. In an embodiment of the present disclosure, the second layer 208 provides stiffness, rigidity, and resistance to the optical fibre ribbon cable 200. In an embodiment of the present disclosure, the second layer 208 has a thickness in range of about 1.6 millimeter to 3 millimeter. In another embodiment of the present disclosure, range of the thickness of the second layer 208 may vary.

The optical fibre ribbon cable 200 includes the plurality of strength members 210. Each of the plurality of strength members 210 is embedded in the second layer 208. In general, embedded strength members provide high tensile strength and anti-buckling property to cables. The plurality of strength members 210 provides strength and durability to the optical fibre ribbon cable 200. In addition, the plurality of strength members 210 has high mechanical strength and provides protection to the optical fibre ribbon cable 200. In general, strength members are used in the aerospace, automotive, marine, construction industries and the like. In an embodiment of the present disclosure, each of the plurality of strength members 210 is made of fibre reinforced plastic (FRP) material. In another embodiment of the present disclosure, each of the plurality of strength members 210 is made of any other suitable material. In an embodiment of the present disclosure, each of the plurality of strength members 210 has a diameter in a range of about 0.5 millimeter to 1.6 millimeter. In another embodiment of the present disclosure, the plurality of strength members 210 has the diameter of any suitable range. In an embodiment of the present disclosure, number of the plurality of strength members 210 is 6. In another embodiment of the present disclosure, the number of the plurality of strength members 210 may vary. In an embodiment of the present disclosure, each of the plurality of strength members 210 is positioned at an equal distance to each other along the circumference of the second layer 208.

The optical fibre ribbon cable 200 includes the plurality of ripcords 212, 214. In an embodiment of the present disclosure, the plurality of ripcords 212, 214 is positioned diametrically opposite (180 degree apart) in between the first layer 204 and second layer 208. The plurality of ripcords 212, 214 facilitates stripping of the second layer 208. In an embodiment of the present disclosure, each of the plurality of ripcords 212, 214 has a circular cross-section. In an embodiment of the present disclosure, a number of the plurality of ripcords 212, 214 is 2. In another embodiment of the present disclosure, the number of the plurality of ripcords 212, 214 may vary. In an embodiment of the present disclosure, the plurality of ripcords 212, 214 is made of polyester filament yarn twisted and coated with wicking material. In another embodiment of the present disclosure, the plurality of ripcords 212, 214 is made of any other suitable material.

The optical fibre ribbon cable 200 includes the one or more water swellable yarns 216. The one or more water swellable yarns 216 are positioned between the plurality of buffer tubes 206. The one or more water swellable yarns 216 prevent ingression of water in the optical fibre ribbon cable 200. In an embodiment of the present disclosure, number of the one or more water swellable yarns is at least one. In another embodiment of the present disclosure, the number of the one or more water swellable yarns 216 may vary.

The optical fibre ribbon cable 200 has a weight of about 332.7 kilogram per kilometer. In addition, the optical fibre ribbon cable 200 has a diameter. The diameter of the optical fibre ribbon cable 200 is about 22.9 millimeters. The optical fibre ribbon cable 200 provides flexibility to each ribbon of the optical fibre ribbon stack 218 and allows each ribbon of the optical fibre ribbon stack 218 to bend in non-preferential axis. The bending of each ribbon of the optical fibre ribbon stack 218 in non-preferential axis allows easy installation in space constraint regions. In addition, the bending of each ribbon of the optical fibre ribbon stack 218 in non-preferential axis reduces the diameter of the plurality of buffer tubes 206 and the diameter of the optical fibre ribbon cable 200.

Further, it may be noted that in FIG. 2, the optical fibre ribbon cable 200 includes 2592 optical fibres; however, those skilled in the art would appreciate that more or less number of optical fibres are included in the optical fibre ribbon cable 200.

The optical fibre ribbon cable has numerous advantages over the prior art. The optical fibre ribbon cable is easy to install in space constraint regions. In addition, the optical fibre ribbon cable has reduced diameter. Moreover, the optical fibre ribbon cable has reduced weight. In addition, the optical fibre ribbon cable maintains planarity of each ribbon of the optical fibre ribbon stack. Further, the optical fibre ribbon cable provides flexibility to each ribbon of the optical fibre ribbon stack. Each ribbon of the one or more ribbon stack is capable to bend in non-preferential axis.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An optical fibre ribbon comprising:
a plurality of optical fibres bonded with a matrix material, wherein the matrix material is applied along a longitudinal length of the plurality of optical fibres, wherein the plurality of optical fibres is partially bonded along the longitudinal length of the optical fibre ribbon, wherein each of plurality of optical fibres is defined by a geometrical centre and diameter, wherein the plurality of optical fibres has a predefined distance between geometrical centres of any two adjacent optical fibres of the plurality of optical fibres, wherein the predefined distance between geometrical centres of any two adjacent optical fibres of the plurality of optical fibres is less than 200 microns, wherein the optical fibre ribbon has a width of 2.19 millimetre, corresponding to 180 microns diameter of the plurality of optical fibres and the predefined distance of 180 microns.

2. The optical fibre ribbon as claimed in claim 1, wherein the predefined distance between geometrical centres of any two adjacent optical fibres is equal to diameter of each of the plurality of optical fibres.

3. The optical fibre ribbon as claimed in claim 1, wherein the predefined distance between geometrical centres of any two adjacent optical fibres of the plurality of the optical fibres is in a range of 160 microns to 200 microns.

4. The optical fibre ribbon as claimed in claim 1, wherein the plurality of optical fibres has the diameter in a range of 160 microns to 200 microns.

5. The optical fibre ribbon as claimed in claim 1, wherein the plurality of optical fibres of the optical fibre ribbon along with the matrix material is defined by a top surface and a bottom surface, wherein thickness of the matrix material over the plurality of optical fibres on the top surface and the bottom surface of the optical fibre ribbon is in a range of 15 microns to 60 microns on each of the top surface and the bottom surface.

6. The optical fibre ribbon as claimed in claim 1, wherein the optical fibre ribbon has a height in a range of 190 microns to 320 microns.

7. The optical fibre ribbon as claimed in claim 1, wherein the optical fibre ribbon has a width in a range of 1.95 millimetre to 2.55 millimetre.

8. The optical fibre ribbon as claimed in claim 1, wherein the matrix material may or may not occupy a shape of the optical fibre ribbon, wherein a shape of the matrix material is one of a grooved shape or a flat shape.

9. The optical fibre ribbon as claimed in claim 1, wherein each of the plurality of optical fibres of the optical fibre ribbon has a primary coating, a secondary coating and a color coating.

* * * * *